J. K. MINICH
FELLY-EXPANDERS.

No. 174,970. Patented March 21, 1876.

Witnesses:
H. H. Dodge
W. Chaffee

Inventor:
J. K. Minich
by Dodge & Son
Attys.

UNITED STATES PATENT OFFICE.

JACOB K. MINICH, OF NORTHAMPTON, OHIO.

IMPROVEMENT IN FELLY-EXPANDERS.

Specification forming part of Letters Patent No. 174,970, dated March 21, 1876; application filed August 3, 1874.

*To all whom it may concern:*

Be it known that I, JACOB K. MINICH, of Northampton, Clarke county, Ohio, have invented certain new and useful Improvements in Felly-Expanders for Carriage-Wheels, of which the following is a specification:

The invention relates to a peculiar combination and arrangement of devices for expanding the felly of a continuous unbroken tire, for the purpose of securing the latter in place, my devices being applicable not only during the manufacture of the wheels, but also to wheels already in use, so that they may be sold in the market and applied by the consumers to old wheels. The invention consists in the combination, with an unbroken tire, and a divided felly, of a right and left hand screw, provided with nuts seated between and against the ends of the felly, a cap or cover to conceal the parts and retain them in place, and a bolt arranged to hold all the parts together, as hereinafter more fully explained.

Figure 1:
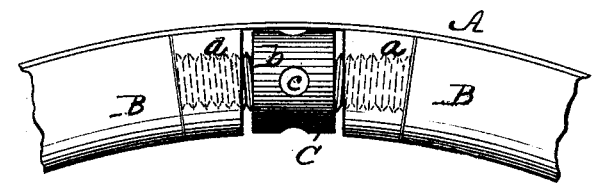
Figure 2:
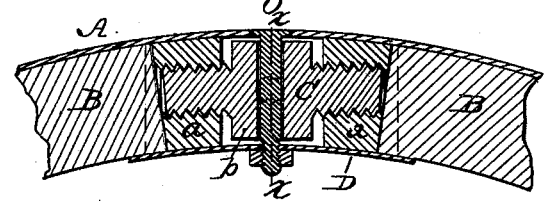
Figure 3:
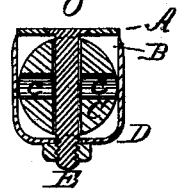

Figure 1 represents a side view of a wheel-rim, provided with my devices, the bolt and cover being removed; Fig. 2, a longitudinal section of the same, with all the parts in position; Fig. 3, a cross-section of the same.

In applying my improvements I take a wheel of ordinary construction, having an endless unbroken tire, A, and a wooden felly, B, and, after first cutting the felly in two transversely and removing a short section therefrom, in order to leave a recess or cavity for the reception of the expanding devices, I bore a small bolt-hole through the tire opposite the middle of said cavity or recess. I then seat in the cavity a bolt or screw, C, having its respective ends provided with right and left hand threads and with nuts or blocks, *a*, which latter are seated, as shown, firmly against the ends of the felly. I form the bolt with an enlarged body, *b*, at the middle and provide the same with transverse holes *c*, to receive an operating rod or wrench. I next provide a thin metal cover, D, of a U form in cross-section, adapted to fit snugly over the ends of the felly, as shown in Figs. 2 and 3, so as to conceal the parts from sight and retain them in place. In the middle of the cover I make a bolt-hole, and through the hole in the tire, the middle of the bolt C and the cover, I insert a bolt, E, and then provide the same at the inner end with a nut, as shown, so that it serves to hold the bolt C from turning and to secure the cover in place. When the parts are all in position the wheel presents a neat and finished appearance, with nothing unusual to attract attention. In the event of the tire becoming loose it is only necessary to remove the bolt and cover, turn the screw until the felly is expanded to the required extent, and then replace the parts, an operation which may be performed in a few moments, at any place, and by unskilled persons.

When a long dry season is followed by a very damp one, which will cause an expansion of the wood and thereby produce a dangerous strain upon the tire, the screw may be turned backward and the felly permitted to contract.

My devices are extremely simple, cheap, and efficient; are readily applied to old and new wheels alike; are susceptible of ready adjustment; are not objectionable in appearance; and are free from the objections to those which require a severance of the tire and the filing and fitting of the parts when an adjustment is to be made.

I am aware that various devices and combinations have been hitherto devised for the purposes of expanding the felly and of contracting the tire, and I therefore make no broad claim thereto; but I am not aware that any one has hitherto produced my combination, consisting of five pieces only, applicable to ordinary wheels, permitting the use of an unbroken tire, and requiring the removal of a single bolt only in order to permit an adjustment.

Having described my invention, what I claim is—

In combination with a wheel, having a continuous unbroken tire, A, and a divided felly, B, the right and left screw C, provided with the enlaged waist *b* and holes *c*, the nuts or blocks *a*, the cover D, and the bolt E inserted through the tire, the screw, and the cover, as shown.

JACOB K. MINICH.

Witnesses:
J. J. SMITH,
GEORGE W. DALIE.